(12) United States Patent
Adams et al.

(10) Patent No.: US 7,117,906 B2
(45) Date of Patent: Oct. 10, 2006

(54) DATUM BASED INTERCHANGEABLE FUEL CELL CARTRIDGES

(75) Inventors: Paul Adams, Monroe, CT (US); Andrew J. Curello, Hamden, CT (US)

(73) Assignee: Societe BIC, Clinchy Cedex (FR)

( * ) Notice: Subject to any disclaimer, the term of this patent is extended or adjusted under 35 U.S.C. 154(b) by 0 days.

(21) Appl. No.: 10/773,481

(22) Filed: Feb. 6, 2004

(65) Prior Publication Data

US 2005/0173022 A1    Aug. 11, 2005

(51) Int. Cl.
*B65B 1/04* (2006.01)
(52) U.S. Cl. .................... 141/351; 141/367; 429/34; 320/101
(58) Field of Classification Search ............. 141/351, 141/367; 429/9, 13, 34, 38; 320/101
See application file for complete search history.

(56) References Cited

U.S. PATENT DOCUMENTS

| 5,945,231 A | 8/1999 | Narayanan et al. |
| 5,992,008 A | 11/1999 | Kindler |
| 6,828,049 B1 * | 12/2004 | Bullock et al. |
| 6,887,596 B1 * | 5/2005 | Leban |
| 2003/0077493 A1 | 4/2003 | Colborn et al. |
| 2003/0082427 A1 | 5/2003 | Prasad et al. |
| 2003/0096150 A1 | 5/2003 | Rice et al. |

* cited by examiner

*Primary Examiner*—Steven O. Douglas
(74) *Attorney, Agent, or Firm*—The H. T. Than Law Group

(57) ABSTRACT

The present invention is directed to a fuel supply adapted to be connected to a host device, such as an electronic device powered by a fuel cell. The fuel supply comprises a front face and at least one functional element, wherein the at least one functional element is positioned relative to a datum defined on the front face. The front face is positioned opposite to a corresponding face on the host device, and the datum matches a matching datum on the host device and the at least one functional element is connected to corresponding connection on the host device. An adapter is also provided.

35 Claims, 15 Drawing Sheets

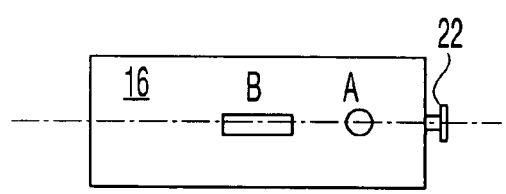
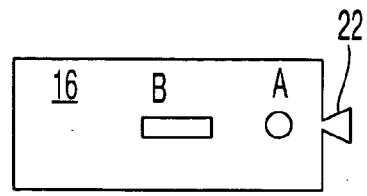
*Fig. 3c*      *Fig. 3d*
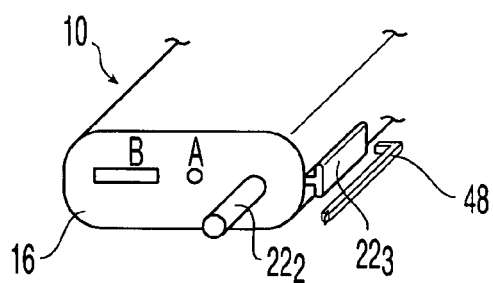
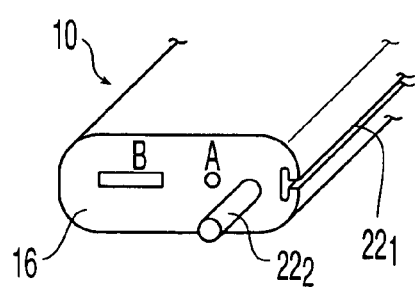
*Fig. 3f*      *Fig. 3e*

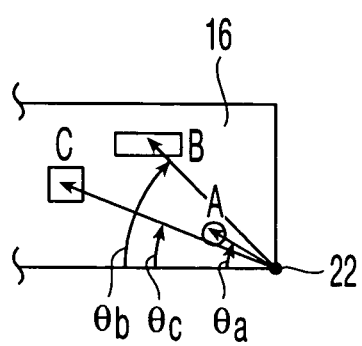
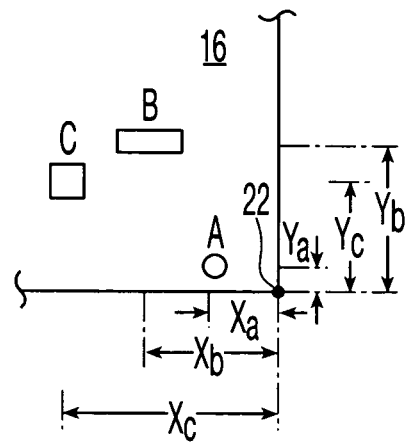
Fig. 7a
Fig. 7b
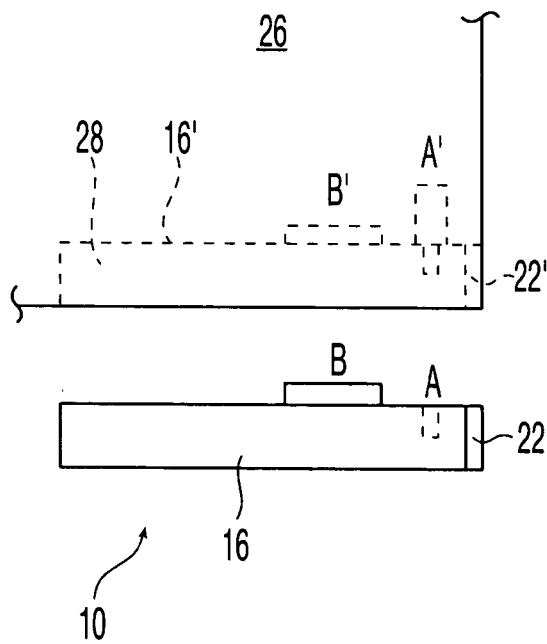
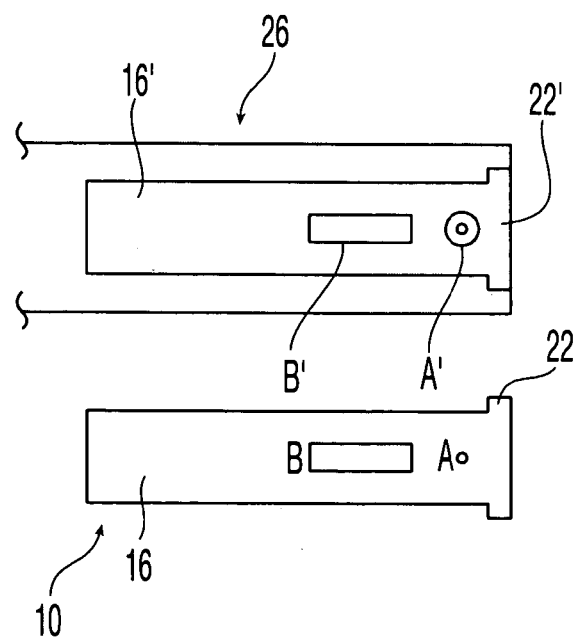
Fig. 8a
Fig. 8b

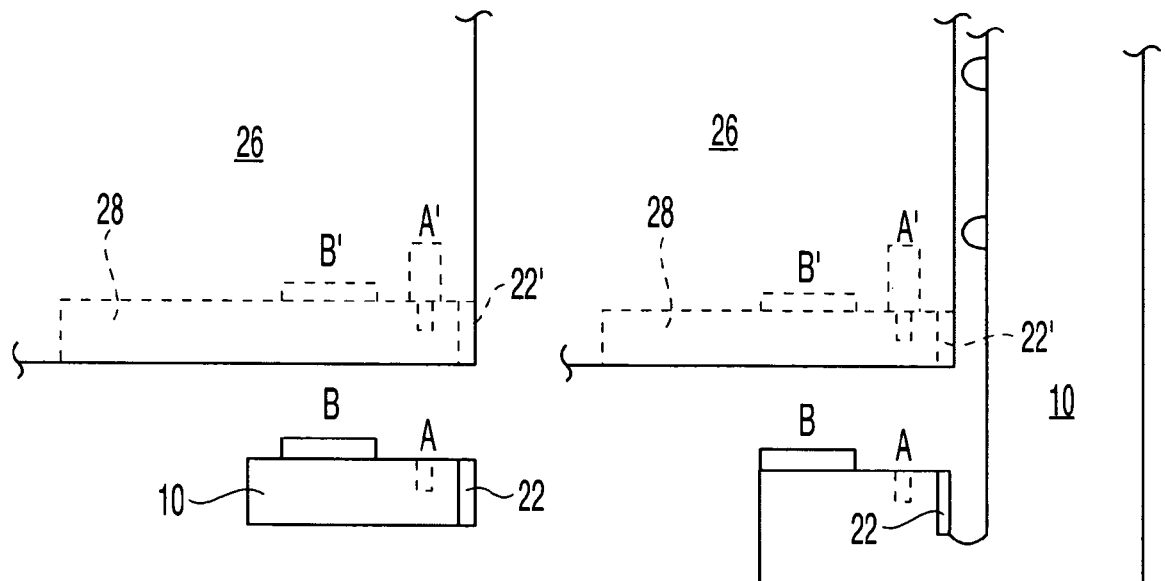
Fig. 8c
Fig. 8d
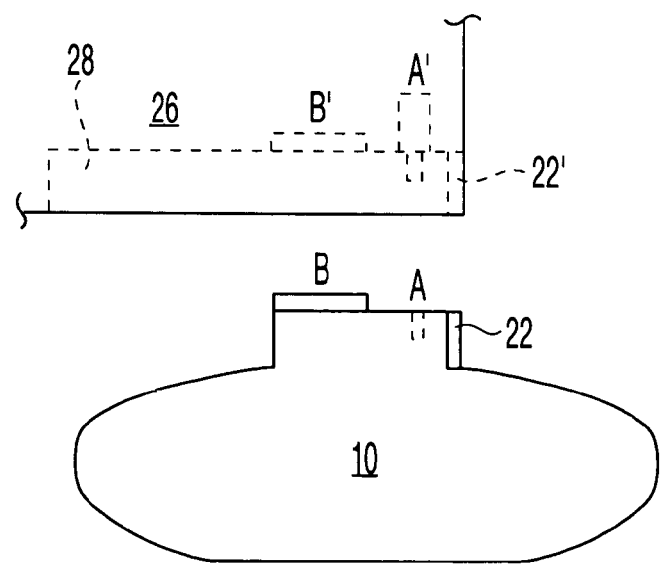
Fig. 8e

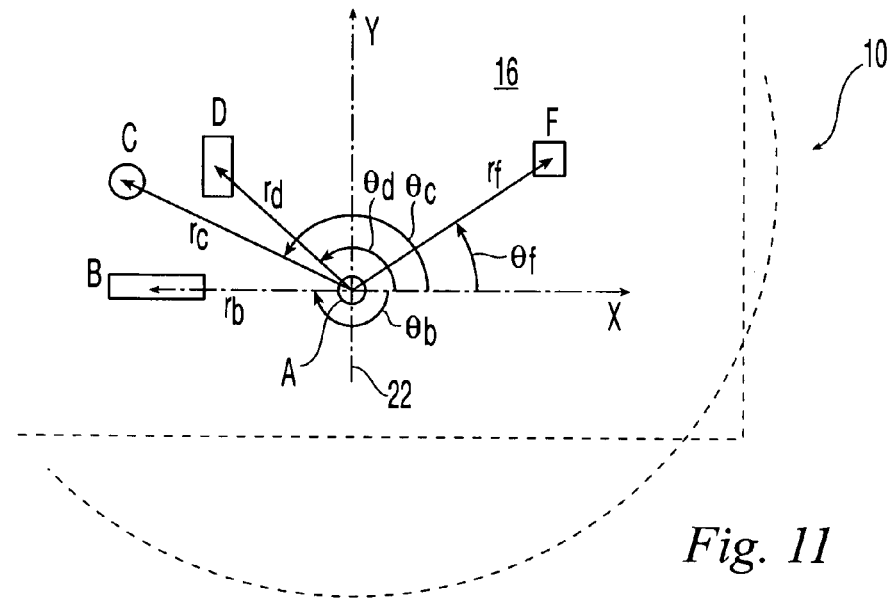
Fig. 11
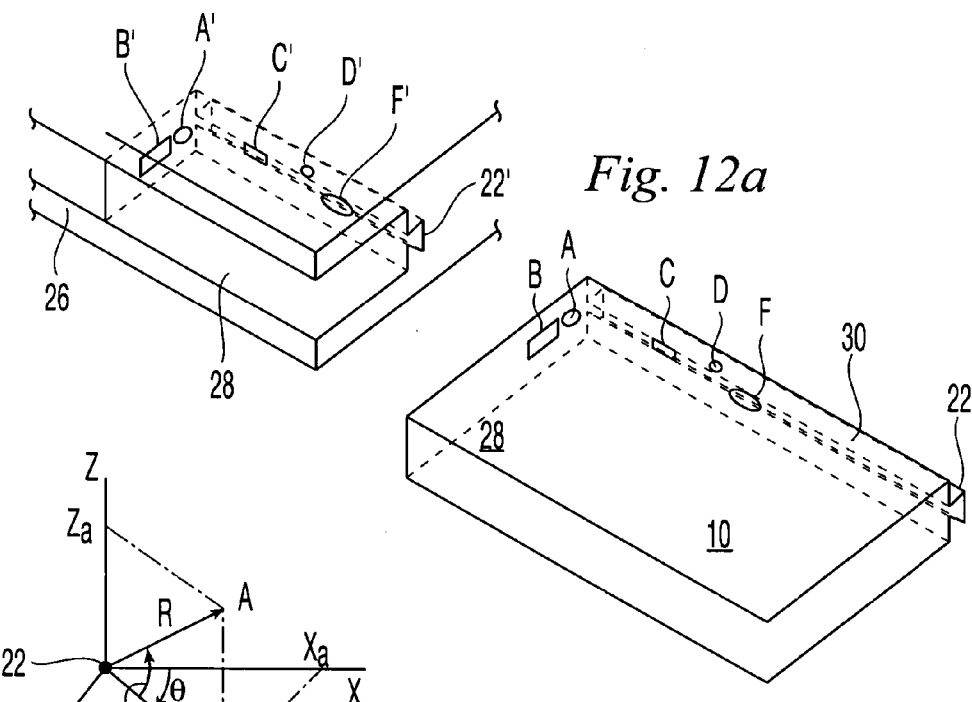
Fig. 12a
Fig. 12b

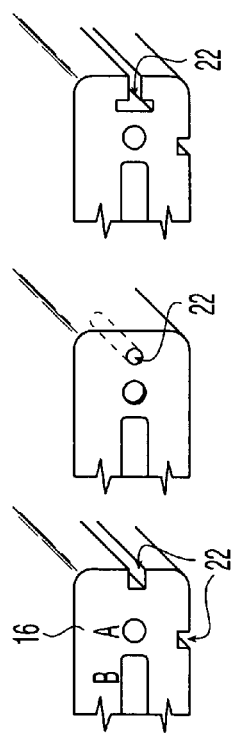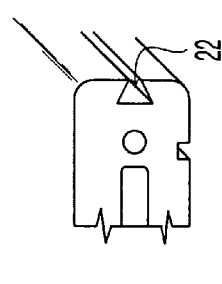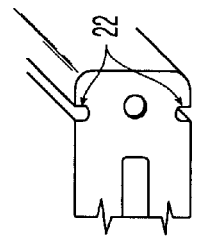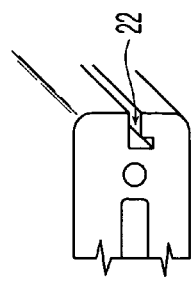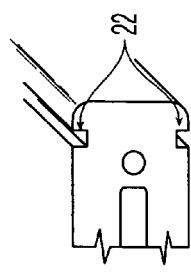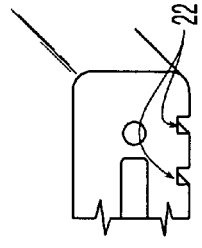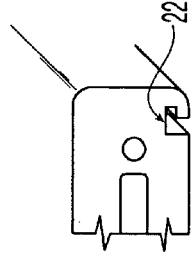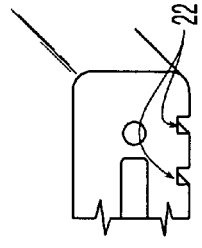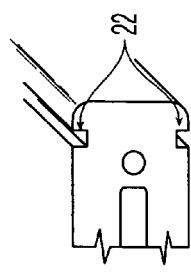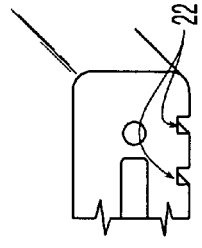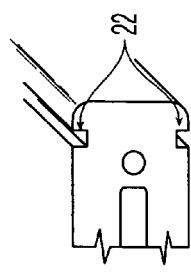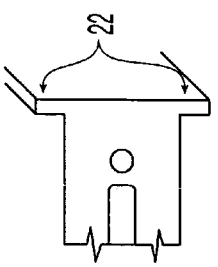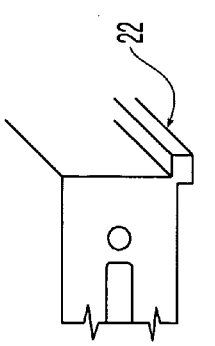

DATUM BASED INTERCHANGEABLE FUEL CELL CARTRIDGES

FIELD OF THE INVENTION

This invention generally relates to fuel cell supplies, and more particularly to fuel supplies that are interchangeably used in multiple host devices or fuel cell devices such as charges for electronic devices.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane (PEM) fuel cells that use methanol ($CH_3OH$), sodium borohydride ($NaBH_4$), hydrocarbons (such as butane) or other fuels reformed into hydrogen fuel, and PEM fuel cells that can use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode, and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$O_2 + 4H^+ + 4e^- \rightarrow 2H_2O$$

The overall fuel cell reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers and power tools, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

As discussed above for other fuel cells, fuel is reformed into hydrogen and the hydrogen reacts with oxidants in the fuel cell to produce electricity. Such reformat fuel includes many types of fuel, including methanol and sodium borohydride. The cell reaction for a sodium borohydride reformer fuel cell is as follows:

$$NaBH_4\ (aqueous) + 2H_2O \rightarrow (\text{heat or catalyst}) \rightarrow 4(H_2) + (NaBO_2)\ (aqueous)$$

$$H_2 \rightarrow 2H^+ + 2e^-\ (\text{at the anode})$$

$$2(2H^+ + 2e^-) + O_2 \rightarrow 2H_2O\ (\text{at the cathode})$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in U.S. published patent application No. 2003/0082427, which is incorporated herein by reference.

Fuel supplies or power supplies, such as batteries, are often commercially available in select sizes, e.g., AA, AAA, C and D batteries. Each type is sized and dimensioned to be used in a fixed set of electronic devices and the batteries cannot be used interchangeably in multiple electronic devices. Furthermore, the voltage and current outputs from the various batteries are different.

Hence, there remains a need in the art for fuel supplies that can be used interchangeably with different types of host or electronic devices.

SUMMARY OF THE INVENTION

The present invention is directed to a fuel supply for fuel cells that can be used with multiple electronic devices.

The present invention is further directed to a fuel supply for fuel cells based on a datum method.

The present invention is directed to a fuel supply containing fuel adapted to be connected to a host device, wherein the fuel supply comprises a front face and at least one functional element. The functional element is positioned relative to a datum defined on the fuel supply. When the fuel supply is connected to the host device, the front face is positioned opposite to a corresponding face on the host device, and the datum matches a matching datum on the host device. The functional element is, therefore, connected to a corresponding connection on the host device.

The host device can be an electronic device powered by a fuel cell, a fuel cell or a battery charger, among others. The functional element can be located on the front face, on a side of the cartridge, on a top of the cartridge, on a bottom of the cartridge or on a back face of the cartridge. The front face can be substantially flat or curved. The front face may comprise planar or non-planar portions, and the planar portions can be parallel or angled to each other.

In accordance to another aspect of the present invention, the functional element coincides with the datum. The functional element can be a shut-off valve, memory storage device, connections (mechanical, electrical, pneumatic, etc.), sensors, locks, latches, fuel filling port, orientation features or guides, among other things. In accordance to another aspect of the present invention, the datum can be a corner datum, a protruding datum, a width datum, orthogonal datum points, a notch datum, or orthogonal datum legs, among others.

In accordance to another aspect of the present invention, the position of the functioning element is measured from the datum using a Cartesian coordinate or a polar or spherical coordinate.

In accordance to another aspect of the present invention, only a portion of the front face of the fuel supply and a portion of the corresponding face on the host device are standardized.

In accordance to another aspect of the present invention, an adapter is provided for connecting a fuel supply to a host device. The adapter comprises at least one first functional element adapted to connect with a corresponding first connection on the host device. The first functional element is positioned relative to a first datum on the adapter. The adapter is also connected to the fuel supply so that fuel from the fuel supply is transported from the fuel supply to the host device. Such connection can include tubing(s) or manifold(s).

Alternatively, such connection can be accomplished by at least one second connection on the adapter, which is sized and dimensioned to connect to a corresponding second functional element on the fuel supply so that the fuel supply is functionally connected to the host device. The first functional element is positioned relative to a first datum on the adapter and the second functional element is positioned relative to a second datum on the fuel supply. The position of the first functional element relative to the first datum is substantially the same as the position of the second functional element relative to the second datum.

BRIEF DESCRIPTION OF THE DRAWINGS

In the accompanying drawings, which form a part of the specification and are to be read in conjunction therewith and in which like reference numerals are used to indicate like parts in the various views:

FIGS. 3(*e*)–(*f*) are perspective views of other protruding datum based cartridges in accordance with the present invention;

FIGS. 7(*a*)–(*b*) are front views of additional datum based cartridges in accordance with the present invention;

FIG. 8(*a*) is a top view of an electronic device and protruding datum based cartridge in accordance with the present invention; FIG. 8(*b*) is a front view of the electronic device and cartridge of FIG. 8(*a*); and FIGS. 8(*c*)–(*e*) are top views of the electronic device shown in FIG. 8(*a*) with cartridges having various shapes but same datum;

FIG. 11 is a front view of a datum coinciding with one or more functional elements of the cartridge;

FIG. 12(*a*) is a perspective view of an electronic device and a cartridge where functional elements are disposed on more than one side of the cartridge; FIG. 12(*b*) shows two three-dimensional coordinate systems suitable for expressing the positions of the functional elements relative to the datum;

FIG. 14(*b*) is a perspective view of another adapter;

FIGS. 16(*a*)–(*o*) are partial front views of additional embodiments of the present invention.

DETAILED DESCRIPTION OF THE PREFERRED EMBODIMENTS

Figure 1:
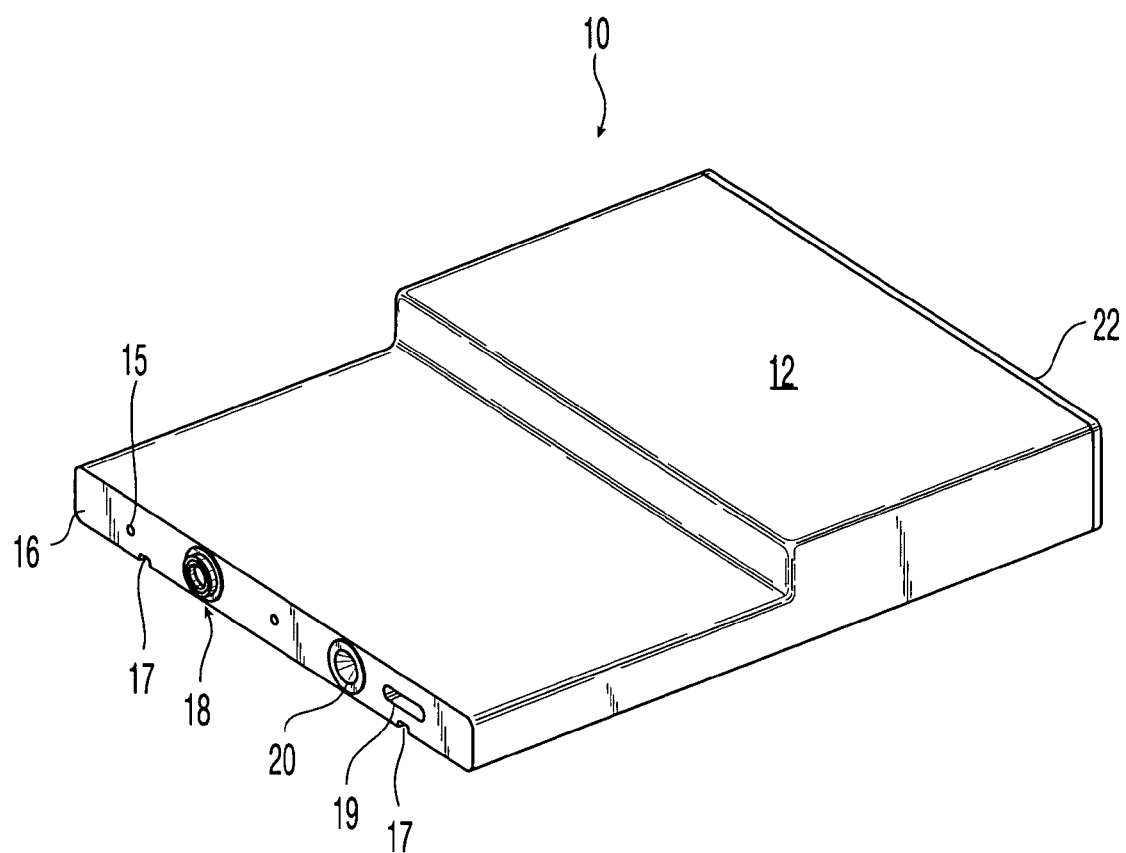
FIG. 1 is a perspective view of a suitable fuel cell fuel cartridge.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell and reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. published patent application No. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water, discussed above. Fuels further include hydrocarbon fuels, which include, but are not limited to, butane, kerosene, alcohol and natural gas, disclosed in U.S. published patent application No. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20–25. Other applications include storing traditional fuels for internal combustion engines, and hydrocarbons, such as butane for pocket and utility lighters and liquid propane.

In accordance to an aspect of the present invention, a datum is provided to ensure that a fuel cartridge is properly inserted into a host device or an electronic equipment powered by a fuel cell. This datum method is also suitable for use during the cartridge manufacturing process and/or during the assembly of internal fuel chambers in electronic devices. According to this method, a datum is selected, and geometrically relative to this datum some or all functional features on the cartridge, i.e., valves, connections (fluidic, electrical, pneumatic or mechanical), refill valves, orientation guides, sensors, locks or latches, etc., would be located. The datum, which may have one or more controls, ensures proper alignment of these features to corresponding features on the electronic devices and proper insertion.

Additionally, so long as the datum requirements are satisfied and the cartridges are dimensionally compatible with the receiving compartment, cartridges of any size can be inserted into the electronic devices. Even when the available cartridge is larger than the receiving compartment in the electronic device, the datum can assure proper connection while a portion of the cartridge remains outside of the electrical device. Additionally, an adapter satisfying the datum requirements can be used as the interface between the available cartridge and the electronic device, so that the electronic device can be used, e.g., in case of emergency. An adapter is disclosed in commonly owned, co-pending patent application Ser. No. 10/725,264, entitled "Method and Apparatus for Filling a Fuel Container," filed Dec. 1, 2003. This co-pending application is incorporated herein by reference in its entirety. In addition to size, multiple cartridge shapes as discussed below can be used, so long as the relationship between the functional elements and the datum is controlled.

Referring to FIG. 1, a preferred fuel cartridge 10 is shown. This fuel cartridge is fully disclosed in commonly owned, co-pending patent application Ser. No. 10/725,244, entitled "Fuel Cell Supply Having Fuel Compatible Materials," filed on Dec. 1, 2003. This co-pending application is incorporated herein by reference in its entirety. Fuel cartridge 10 can have any shape, and is sized and dimensioned to supply fuel to fuel cells located in electronic devices that the fuel cells power. Since fuel is a fluid, i.e., liquid or gas, it can fill any container regardless of size or shape, and fuel is consumed the same way by the fuel cell, regardless of the size and shape of the container. Hence, interchangeability among fuel supplies enhances convenience for consumers. Cartridge 10 has outer casing 12 and the inner bladder or liner, which contains the fuel. Preferably, outer casing 12 is more rigid than the liner, and protects the inner liner, which is preferably flexible. Cartridges that comprise an outer casing and an inner liner are fully disclosed in commonly owned, co-pending U.S. patent application Ser. No. 10/629,004, entitled "Fuel Cartridge with Flexible Liner," filed on Jul. 29, 2003. The '004 application is also incorporated herein by reference in its entirety. Other fuel supplies include those disclosed in co-pending patent application Ser. No. 10/356,793, entitled "Fuel Cartridge for Fuel Cells," filed on Jan. 31, 2003. The disclosure of this application is hereby incorporated in its entirety.

At front side 16, cartridge 10 has nozzle or valve 18, and fill port 20. As used herein, front side 16 is the side of cartridge 10 that contains the functional elements of cartridge 10. Fill port 20 is used to transport fuel to liner during the manufacturing process and is sealed after a predetermined amount of fuel, e.g., about 85% to 95% of the capacity of liner 14, has been transported into the liner. The sealing of the fill port can be replaced by a refillable valve. Front side 16 also has asymmetric alignment aperture 15, which is sized and dimensioned to receive a matching protrusion disposed on the device that receives cartridge 10 (not shown). When cartridge 10 is correctly inserted, the protrusion is received by aperture 15 and the cartridge can be fully inserted. When cartridge 10 is incorrectly inserted, e.g., upside down, the protrusion will bump against front side 16 and the cartridge cannot be inserted.

Cartridge 10 defines on its underside at least one guide rail 17, which is adapted to glide or slide on a corresponding rail on the device (not shown) to facilitate the insertion of the cartridge. Additionally, front side 16 also defines electrical interface 19, which may contain the necessary electrical contacts to connect the cartridge to the electronic device or to the fuel cell that powers the electrical device. Electrical interface 19 may also be connected to an electrically readable fuel gage, security devices or an information storage device, such as an EEPROM. Fuel gages, security devices and information storage devices are fully disclosed in co-pending application entitled "Fuel Cell System Including Information Storage Device and Control System," filed on Dec. 1, 2003. This co-pending patent application is incorporated herein by reference in its entirety.

In accordance with one aspect of the present invention, the relevant functional elements, such as alignment aperture 15, guide rails 17, valve 18, electrical interface 19 and fill port 20 are positioned relative to or measured from a datum. These functional elements can be located on front face 16 or any other location on or even inside cartridge 10. As shown in FIGS. 2(a)–2(d), datum 22 can be selected to be one of the corners of front face 16. Front face 16 can be flat, curved or stepped or in any combination thereof, and can include flat, curved or stepped portions thereon. It can also be positioned perpendicular or at any angle to the other surfaces on the cartridge. As illustrated, datum 22 is positioned at the lower right hand corner. Front face 16 of cartridge 10 can be rectangular or square, large or small, regular or irregular, so long as there is at least one corner in this embodiment. The corner can be square, obtuse or acute. Elements A and B, as shown in FIGS. 2(a)–(d), and other alphabetical designations used herein represent any of the relevant functional elements that would be positioned on front side 16. Although, only two are illustrated, there is no limitation on the number functional elements that can be present on front side 16 or on other surfaces of cartridge 10.

Figure 2A:
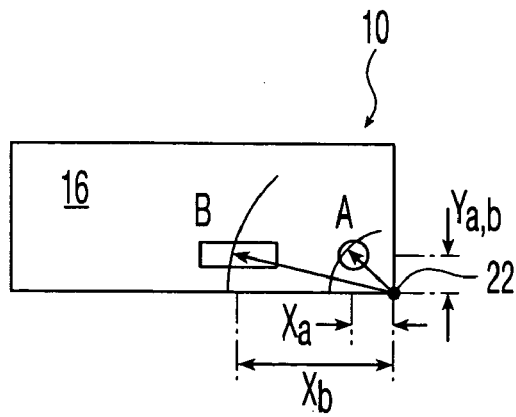
FIGS. 2(*a*)–(*d*) are front views of corner datum based cartridges in accordance with the present invention.
Figure 2B:
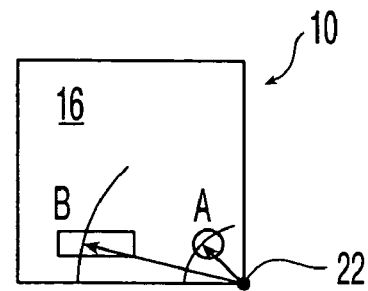
Figure 2C:
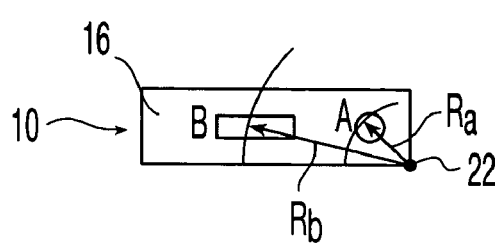
Figure 2D:
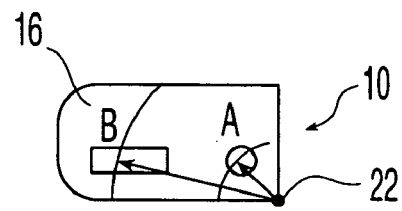

The location of functional elements A and B from datum 22 can be represented by a two-coordinate Cartesian system, such as a horizontal X-axis and vertical Y-axis. As shown in FIG. 2(a), element A is positioned at distances Xa and Ya from datum 22 and element B is positioned at distances Xb and Yb from datum 22. Elements A and B are similarly positioned in FIGS. 2(b)–(c). Alternatively, the location of elements A and B from datum 22 can be represented by radius Ra or Rb from datum 22 and angle θa or θb, where θ can be measured either from the horizontal leg (on the X-axis) or from the vertical leg (on the Y-axis) of the corner that defines datum 22, or from another axis. Also, any corner on front face 16 can define datum 22.

Figure 3A:
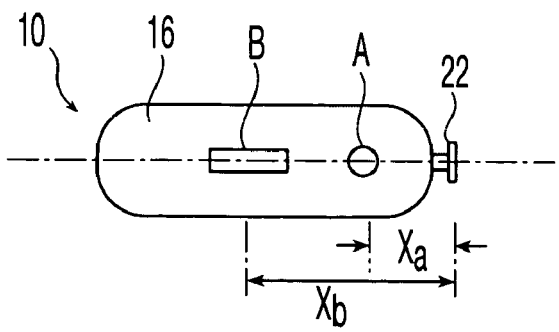
FIGS. 3(*a*)–(*d*) are front views of protruding datum based cartridges in accordance with the present invention.
Figure 3B:
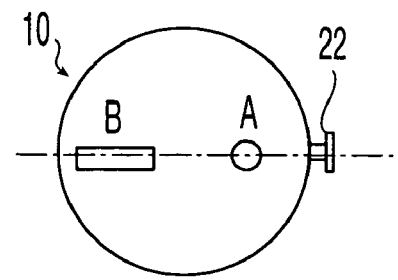

Referring to FIGS. 3(a)–(c), datum 22 is protruding from front face 16. Functional elements A and B are spaced at distance Xa and Xb from datum 22, as shown, in all the cartridges. In this embodiment, elements A and B are positioned on a straight line that intersects datum 22. However, elements A and B can also be spaced above or below this line, i.e., they may also have a vertical Y component in any of the embodiments described herein. Referring to FIG. 3(d), the protruding datum can have any shape, including but not limited to a dovetail shape. Such shape when used with a corresponding track on the device ensures proper fitting. Referring to FIG. 3(e), cartridge 10 can have pin datum $22_2$ that protrudes from front face 16 and cartridge 10 may also have datum $22_1$, which is a notch defined on a side of the cartridge. Datum $22_1$ can also be a dovetail datum. Pin datum $22_2$ can also be paired with dovetail datum $22_3$, as shown in FIG. 3(f). In this embodiment, dovetail datum $22_3$ has a depth that is shorter than the depth of the cartridge.

Figure 4A:
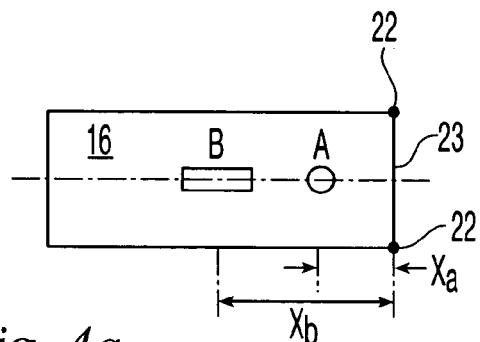
FIGS. 4(*a*)–(*h*) are front views of width datum based cartridges in accordance with the present invention.
Figure 4B:
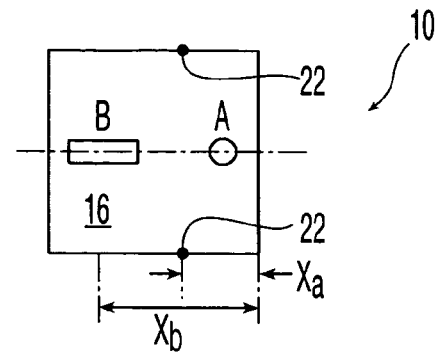
Figure 4C:
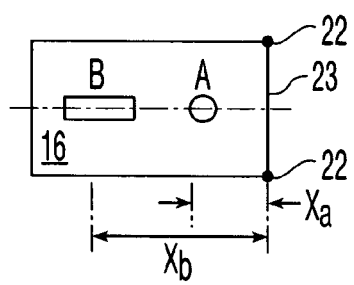
Figure 4D:
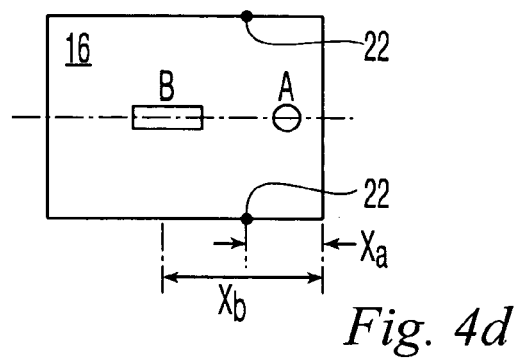
Figure 4E:
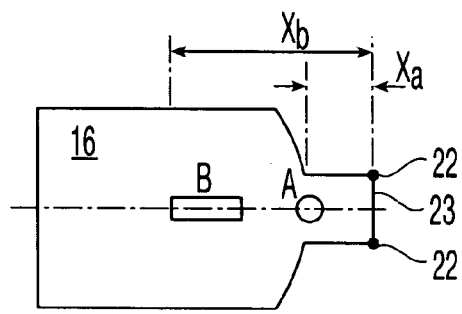
Figure 4F:
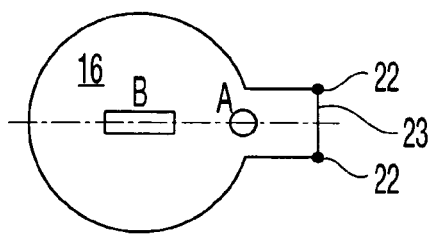
Figure 4G:
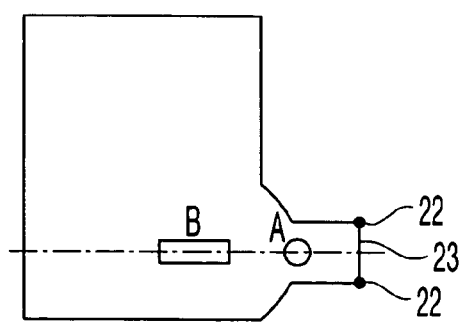
Figure 4H:
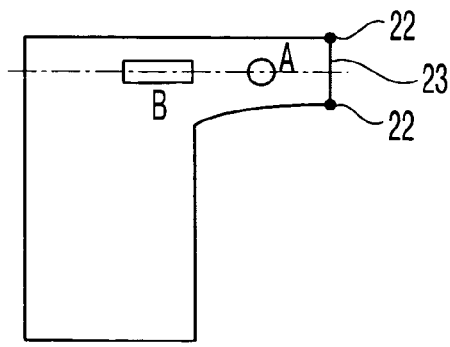

Referring to FIGS. 4(a)–(f), datum 22 can comprise two distinct points and functional elements A and B are positioned at predetermined spaced distances Xa and Xb away from datum 22. In this embodiment, datum 22 is located on a section of front face 16 that has constant width. The datum may also include side 23 between datum points 22. Referring to FIGS. 4(a) and (c), datum 22 is positioned on the corners. Referring to FIGS. 4(b) and (d), datum 22 can also be positioned away from the corners. Referring to FIGS. 4(e) and (f), datum 22 is located on a constant width section, while the remaining front portions have different width or varying width. This constant width section is relatively thinner than the thickest portion of the cartridge. Referring to FIGS. 4(g) and (h), the datum is located on a relatively thin width section similar to FIGS. 4(e) and (f) and the remaining portion of the cartridge can take on any arbitrary shape. Datum 22 can be located a predetermined distance back from the front face but it is preferred that the datum is on the front face. In addition, the width or the thickness of the cartridge can increase or decrease away from the front face (depth). For example, as shown in FIG. 1 the thickness of the cartridge increases away from the front face.

Figure 5A:
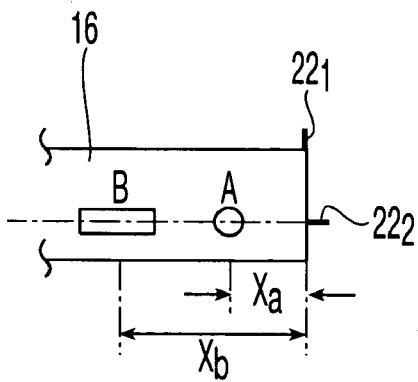
FIGS. 5(*a*)–(*b*) are front views of orthogonal datum based cartridges in accordance with the present invention.

Referring to FIGS. 5(a) and (b), datum 22 comprises orthogonal or perpendicular datum points $22_1$ and $22_2$. In this example, datum point $22_2$ serves as the fixed line so that functional elements A and B are located on a line intersecting point $22_2$. Datum point $22_1$ is the reference line from which distances Xa and Xb are measured.

Figure 5B:
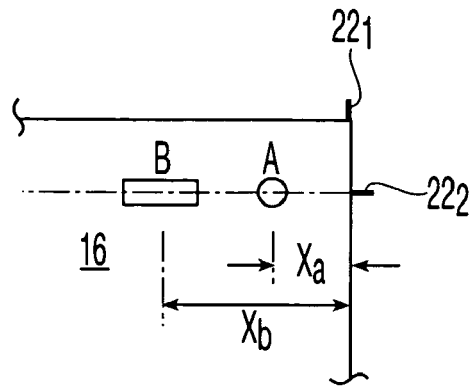
Figure 6A:
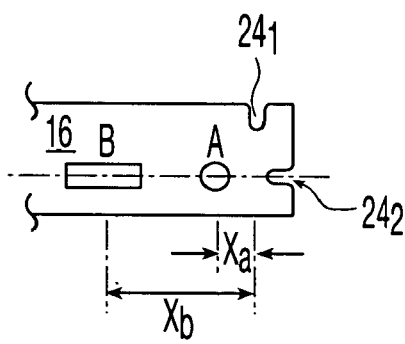
FIGS. 6(*a*)–(*d*) are front views of notch datum based cartridges in accordance with the present invention.
Figure 6B:
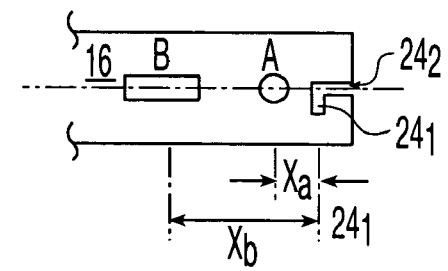
Figure 6C:
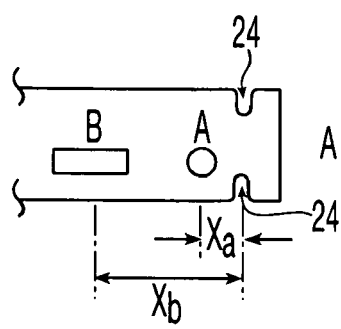
Figure 6D:
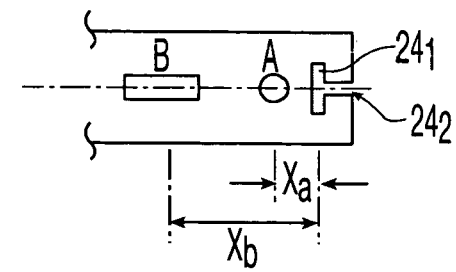

Datum 22 can also be recessed or notched into front face 16 as shown in FIGS. 6(a)–(d). Datum comprising orthogonal notches $24_1$ and $24_2$, similar to the orthogonal datum $22_1$ and $22_2$ in FIG. 5, are shown in FIG. 6(a). Orthogonal notches $24_1$ and $24_2$ can be connected to each other as shown in FIGS. 6(b) and (d). FIG. 6(c) shows datum notches 24 that are similar to datum 22 shown in FIG. 4(d). The notch may go through the entire depth of the cartridge or have a predetermined depth. Preferably the depth should be sufficiently deep to locate, orientate and prevent the cartridge from being inserted incorrectly. Notch datum 24 can also be single point datum.

Functional elements A, B do not need to fall on any particular line passing through datum 22, 24. As illustrated in FIGS. 7(a) and (b), functional elements A, B and C can be located at any position on front face 16. The elements are located at distances (Xa, Ya), (Xb, Yb) and (Xc, Yc), respectively from datum 22. Alternatively, their locations can be expressed as (Ra, θa), (Rb, θb) and (Rc, θc).

The present invention maximizes the interchangeability of fuel cell cartridges. Only a portion of the front face(s) of the cartridge and/or the side wall that carries the functional elements has to be standardized. Hence, electrical devices that are powered by fuel cells can accept many different cartridges, so long as the functional elements are defined relative to a standardized datum.

For example, as shown in FIGS. 8(a) and (b) cartridge 10 with protruding datum 22 is shown along with electronic device 26 having receiving chamber 28, which is adapted to receive cartridge 10. Cartridge 10 has on its front face 16 functional elements A and B, which are positioned relative to datum 22 in accordance with the present invention. Receiving chamber 28 has interior face 16' which corresponds to front face 16. On interior face 16', connections A' and B' are defined and these connections correspond to functional elements A and B. For example, connection A' and functional element A can be a two-component shut-off valve for controlling the flow of fuel from cartridge 10 to electronic device 26. Two-component shut-off valves are fully disclosed in commonly owned, co-pending patent application Ser. No. 10/629,006, entitled "Fuel Cartridge with Connecting Valve," filed on Jul. 29, 2003, which is incorporated herein by reference in its entirety. Connection B' and functional element B, for example, can be an EEPROM data storage device and connections to the controller inside the electronic device. As stated above, functional elements can be any element that is positioned on the front face, side or back of the cartridge and are connectable to corresponding connections in the electronic device. Interior face 16' further comprises matching datum 22' that corresponds with datum 22 on cartridge 10. FIGS. 9(a) and (b) illustrate another electronic device 26 and cartridge 10, similar to those shown in FIGS. 8(a) and (b), except that datum 22 is a corner protruding datum, similar to those shown in FIG. 2.

Hence, when cartridge 10 is inserted into chamber 28, so long as datum 22 and matching datum 22' align with each other, all functional elements, such as A and B, would align with corresponding connections, such as A' and B'. Any cartridge 10 that satisfies the datum requirement can be used, regardless of dimensions, shapes or configurations with any electronic device 26 that has the same datum. A large cartridge and a small cartridge can be substituted for each other so long as the datum points are the same, and only a portion of the front faces needs to be standardized. Similarly, a round cartridge with a diameter smaller than the width of a square cartridge can be substituted for same when the datum points are the same.

FIGS. 8(c)–(e) further illustrate the datum cartridge of the present invention. Chamber 28 has the same dimensions and datum in these illustrations and is adapted to accept cartridges having different shapes and dimensions but with the same datum. In FIG. 8(c), cartridge 10 has the same depth as chamber 28, but has a significantly shorter width. In FIG. 8(d), cartridge 10 has an irregular shape and the same datum. This cartridge has a portion that extends outside of and wraps around the electronic device. In FIG. 8(d), cartridge 10 has a non-polygonal or more specifically circular or elliptical shape and the same datum that can supply fuel to electronic device 26.

Figure 10A:
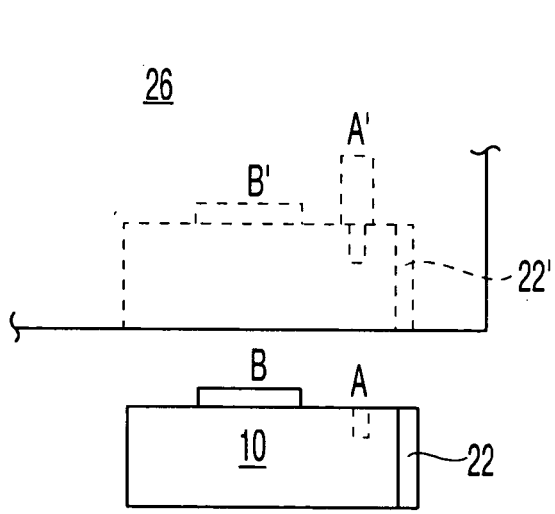
FIGS. 10(*a*)–(*d*) are top views of a single cartridge in accordance with the present invention being usable with various electronic devices.
Figure 10B:
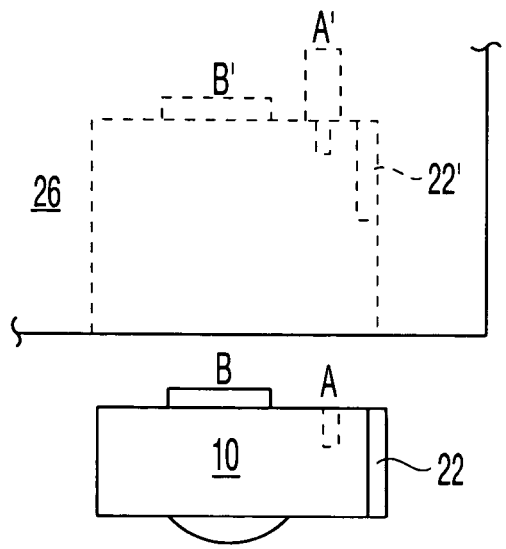
Figure 10C:
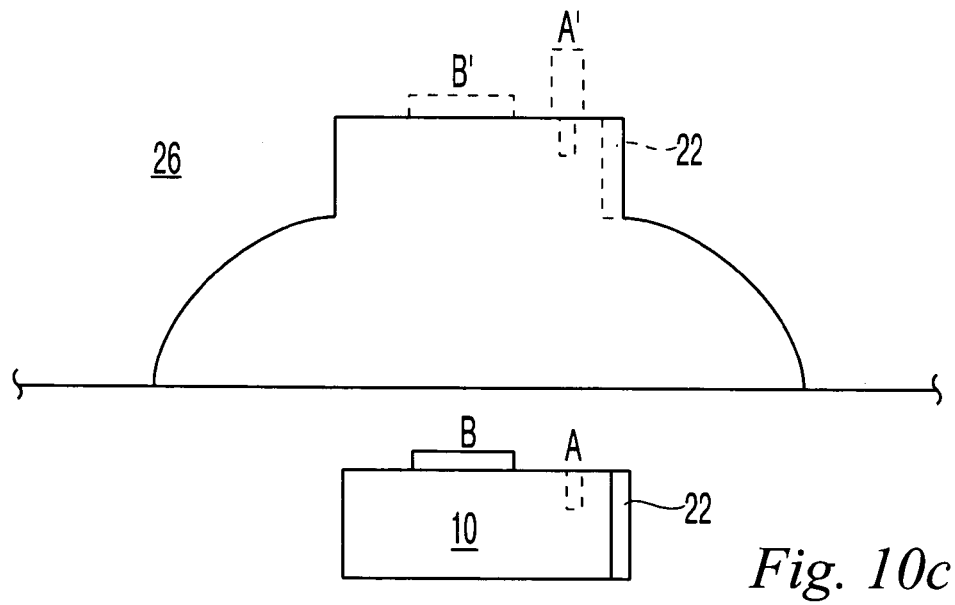
Figure 10D:
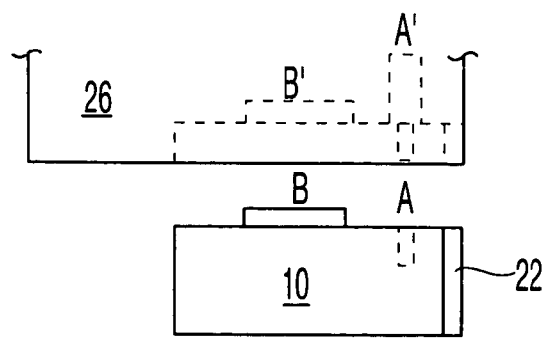

FIGS. 10(a)–(d) show cartridge 10 having the same shape and same dimensions that can be used in electronic devices with chamber 28 of different sizes and dimensions. Both cartridge 10 and chamber 28 have the same datum. FIG. 10(a) shows cartridge 10 having the same shape and dimensions as chamber 28. Cartridge 10 fits flushed with chamber 28. FIG. 10(b) shows cartridge 10 that has the same width but shorter depth than chamber 28. Cartridge 10 fits completely inside chamber 28. FIG. 10(c) shows the same cartridge 10 capable of being fitted into chamber 28 having a non-polygonal shape. FIG. 10(d) shows the same cartridge 10 having the same width but long depth than chamber 18. Cartridge 10 can supply fuel to the electronic device, but after insertion would extend beyond the sides of the electronic device.

Figure 9B:
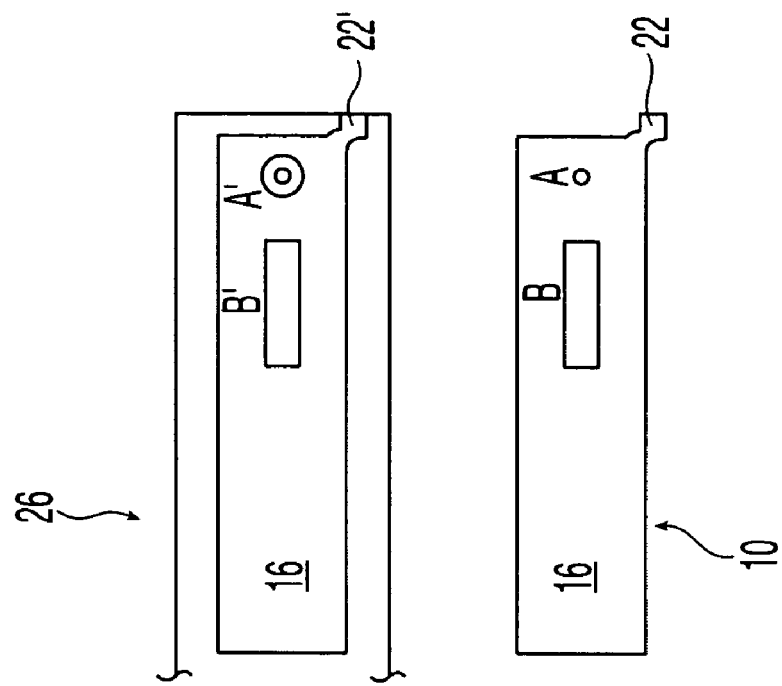
FIGS. 9(*a*) and (*b*) are the top and front views of the electronic device and cartridge of FIGS. 8(*a*) and (*b*), except that the datum is a corner protruding datum.
Figure 9A:
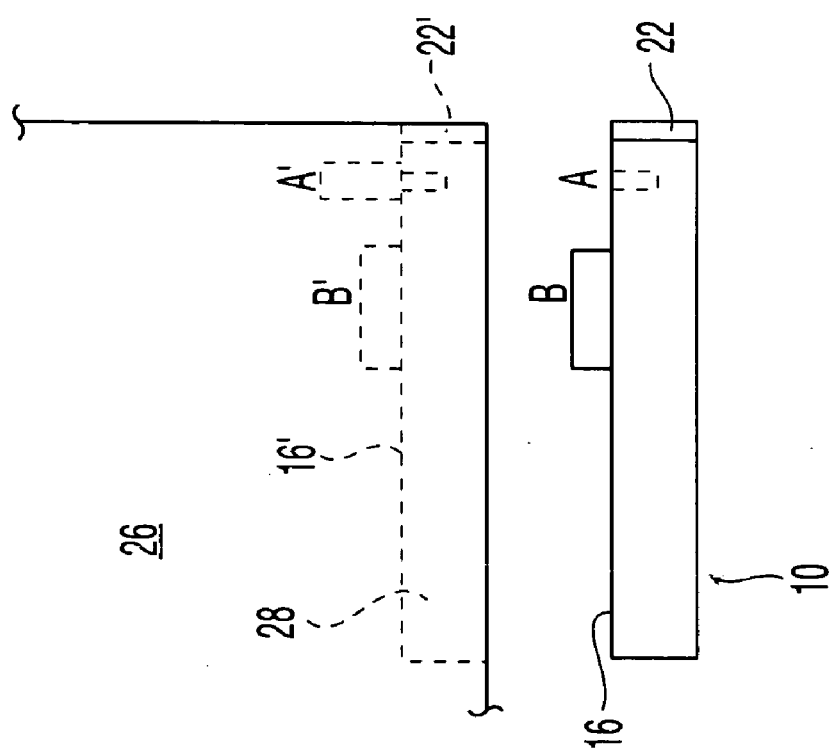

As illustrated in FIGS. 8–10, in some embodiments cartridge 10 fits flushed with the exterior surfaces of electronic device 26. See e.g., FIGS. 8(a) and (b), 9(a) and (b) and 10(a). In other words, after cartridge 10 is fitted into electronic device 26, the back end of the cartridge conforms to the exterior surface of electronic device 26. In contrast, as shown in FIGS. 8(c), (d), (e) and FIGS. 10(b), (c) and (d), after cartridge 10 is fitted into electronic device 26, the cartridge is either protruding from the exterior surfaces of electronic device 26 or is pushed into the interior of electronic device 26.

In accordance with another embodiment of the present invention, datum 22 coincides with at least one functional element. As shown in FIG. 11, datum 22 coincides with functional element A; however, datum 22 may coincide with any functional element. The locations of the other elements are measured from datum 22 or from functional element A. FIG. 11 illustrates these locations in the polar or spherical coordinate. These locations can be expressed as being at a radius R(b, c, d) and angle θ(b, c, d) away from datum 22/element A. Element A can also be expressed as being 0.00 cm/inch distance and 0° from the datum. These locations can also be expressed in the Cartesian coordinate as (Xb, Yb), (Xc, Yc) and (Xd, Yd) from the datum. In this embodiment, the size and shape of front face 16 is less important, so long as the cartridge is insertable into the electronic equipment. As shown, front face 16 can be either circular or polygonal.

In accordance with another embodiment of the present invention, receiving chamber 28 on electronic device 26 is positioned on a corner thereof, or occupies portions of at least two sides of chamber 28. As shown in FIG. 12(a), chamber 28 is bordered by two sides of electronic device 26, and cartridge 10 is adapted to be received by chamber 28. In this embodiment, datum 22 and matching datum 22' are dovetail datum similar to the one shown in FIG. 3(d). A dovetail connection provides a higher level of structural support, and datum that provides additional structural support is preferred, and most preferred if the cartridge extends outside of the electronic device.

As shown, cartridge 10 extends outside of electronic device 26; however, the cartridge can be dimensioned to fit completely inside the electronic device or to fit flushed with the sides of the electronic device. In accordance with another embodiment of the present invention, the functional elements can be positioned on front face 16 or on side 30 as shown, or on any surface of cartridge 10 including the top, bottom or back. Here, functional elements A and B are located on front face 16 and functional elements C, D and F are located on side 30. These functional elements correspond to and mate with connections A', B', C', D' and F' in chamber 28, respectively. As shown, functional elements can be located on the datum itself or spaced from the datum. In this embodiment, the functional elements are not coplanar to each other. A three-dimension coordinate, such as the X-Y-Z Cartesian system or an R, θ, Φ spherical coordinate system, can be used to describe the positions of the functional elements relative to the datum. Schematic, exemplary representations of functional element A relative to datum 22 in the Cartesian and spherical three-dimensional coordinates are shown in FIG. 12(b).

Figure 13A:
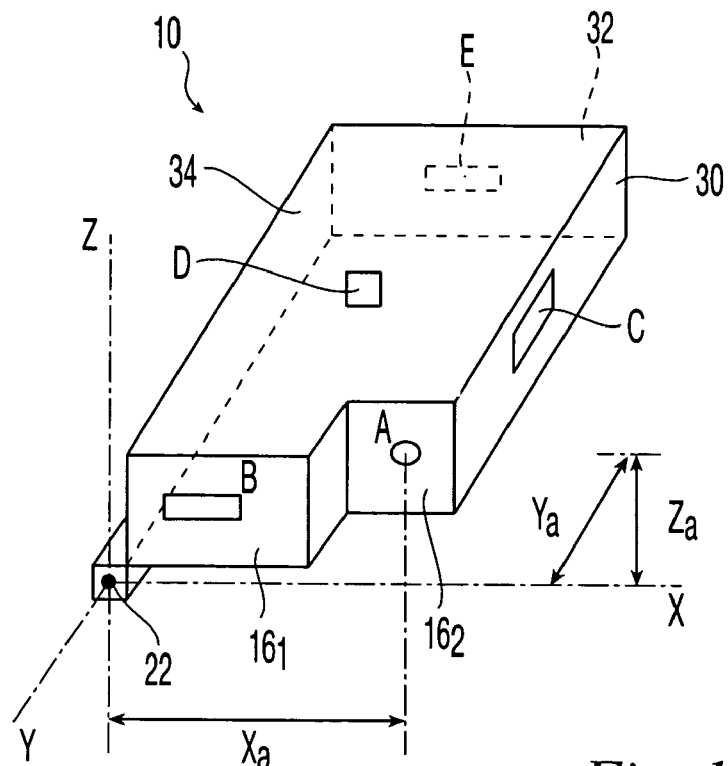
FIGS. 13(*a*)–(*d*) are perspective views of additional embodiments of the present invention.
Figure 13B:
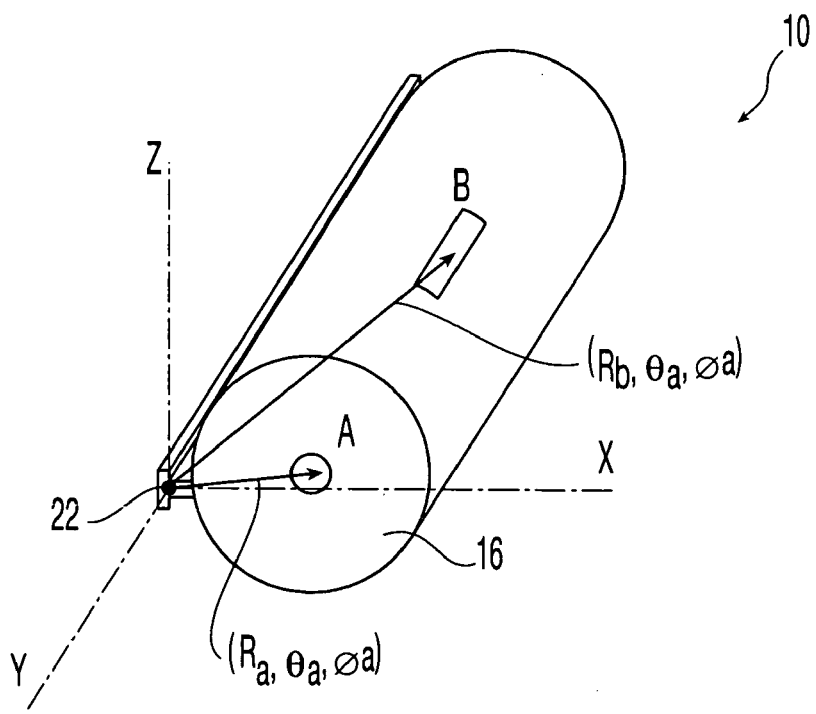
Figure 13C:
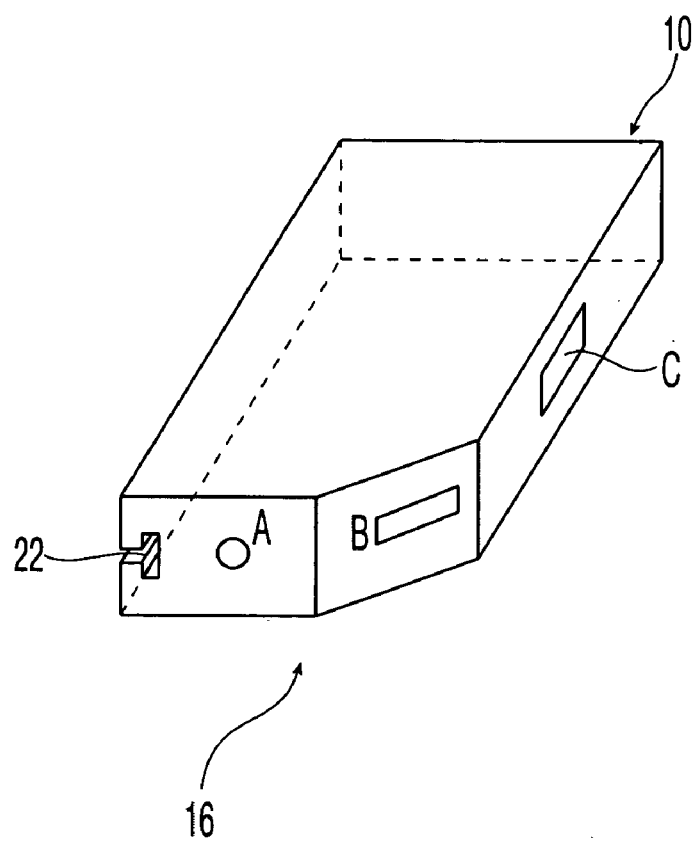
Figure 13D:
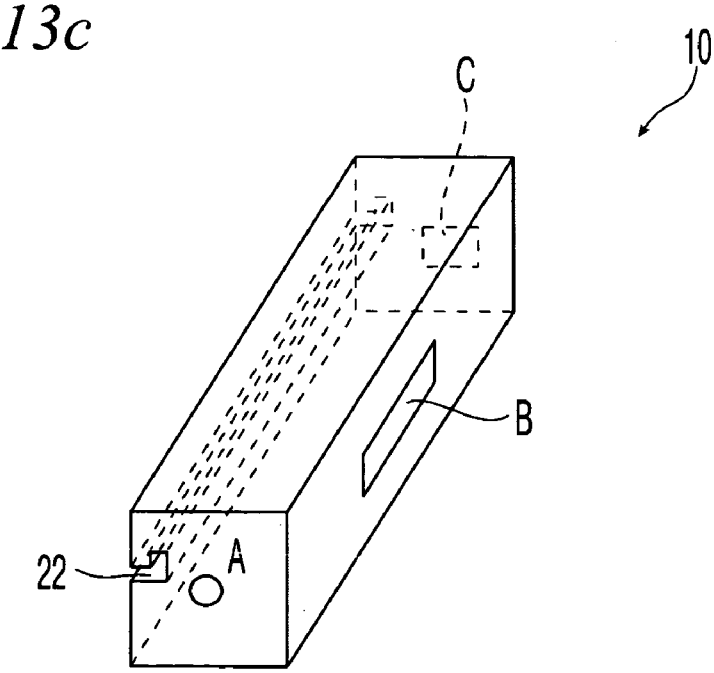

FIGS. 13(a)–(d) further illustrates another embodiment of the present invention. Front face 16 can have any shape. As shown in FIG. 13(a), front face 16 comprises portions 16, and 162, which are non-coplanar to each other. These portions may be parallel to each other or may form an angle between them. Each portion may contain one or more functional elements, or none. These face portions may be substantially flat or curved. The functional elements can be on front face 16, side(s) 30, back 32 or top 34. Datum 22 in FIG. 13(a) is a protruding corner datum. Preferably, the locations of the functional elements are measured from a center or an edge of the datum on face 16, as shown. However, these locations can be measured at any point on datum 22. The functional elements' locations can be expressed in Cartesian coordinate as illustrated in FIG. 13(a) with functional element A, or in a spherical coordinate as illustrated in FIG. 13(b). FIG. 13(b) shows an embodiment where a functional element is located on a circular side of the cartridge. FIG. 13(c) is similar to FIG. 13(a), except that datum 22 is a channel and the front face 16 comprises two portions that are positioned at an angle to each other. FIG. 13(d) is another example of a datum cartridge where functional elements can be located anywhere and datum 22 is a channel. For example, in FIG. 13(d) functional element A can be a valve, functional element B can be a memory storage device and element C can be a spring that exerts a biasing force toward valve A to ensure a good fit between valve A and corresponding connection A' on the electronic device.

Alternately, as shown in FIG. 13(d), the distance between the surfaces, where functional elements A and C are located, can form a datum of fixed length. Two edges or two corners from these surfaces can also form a datum.

Figure 14A:
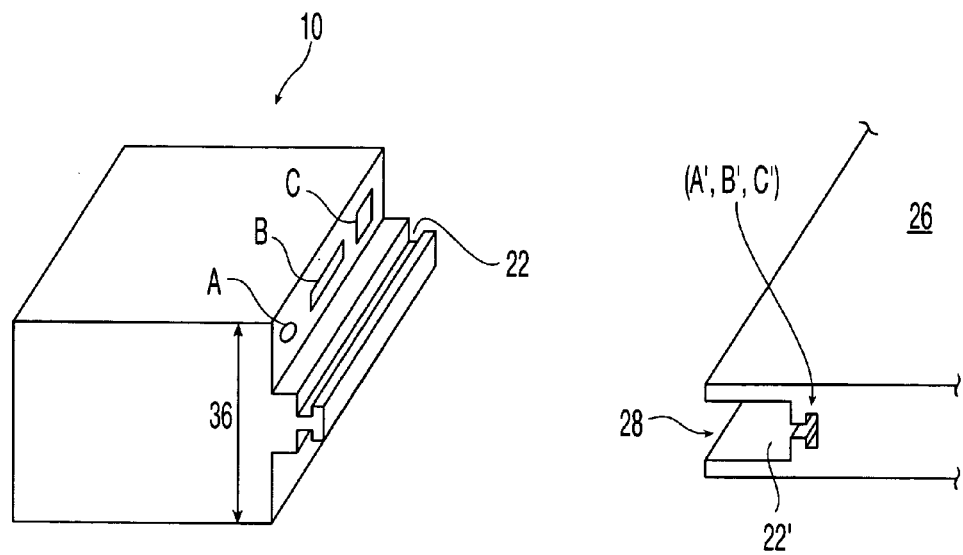
FIG. 14(*a*) is a perspective view of a fuel cartridge, an electronic device and an adapter for connecting the fuel cartridge to the electronic device.

FIG. 14(a) illustrates another embodiment of the present invention. As discussed above, an adapter can be used to couple a relatively large fuel cartridge to a smaller electronic device (and vice versa). Without the adapter the large fuel cartridge will not be able to supply fuel to the smaller electronic device, due to its larger dimensions. In FIG. 14(a), fuel cartridge 10's width 36 is too large to fit into chamber 28 of electronic device 26, and datum 22 of cartridge 10 is too shallow to reach through chamber 28 to mate with matching datum 22' on the electronic device. In accordance to the present invention, adapter 38 is provided to connect datum 22 to matching datum 22'. Adapter 38 has datum 40 that can mate with datum 22' on electronic device 26 and datum 42 that can mate with datum 22 on cartridge 10, as shown. Adapter 38 has proximate to datum 40 the necessary functional elements A, B, C, etc. that connect to the connecting elements A', B', C', etc. on the electronic device, and adapter 38 has proximate to datum 42 the connecting elements A', B', C', etc, that can connect to functional elements A, B, C, etc. on cartridge 10. Internal to adapter 38, functional elements A, B, C, etc. near datum 42 are connected to connections A', B', C', etc. near datum 40 to establish any and all fluidic, electric, mechanical, hydraulic, etc. connections therebetween.

Figure 14A:
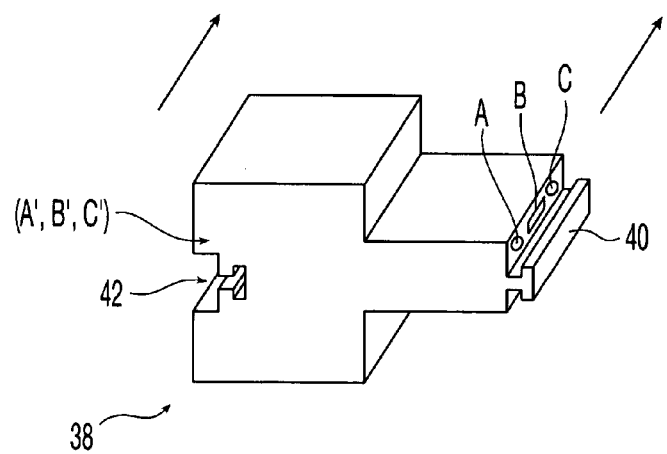
Figure 14B:
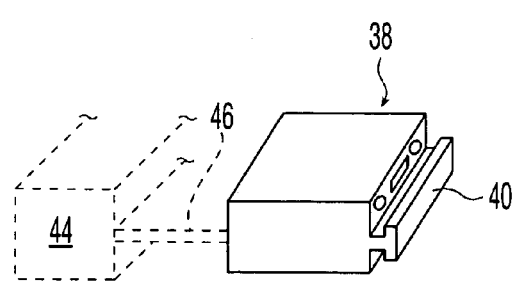
Figure 15C:
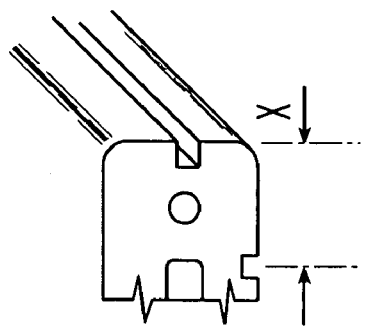
FIGS. 15(*a*)–(*e*) are partial perspective views of additional embodiments of the present invention.
Figure 15B:
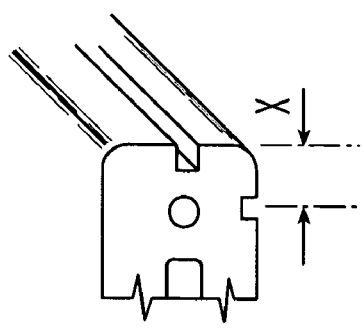
Figure 15A:
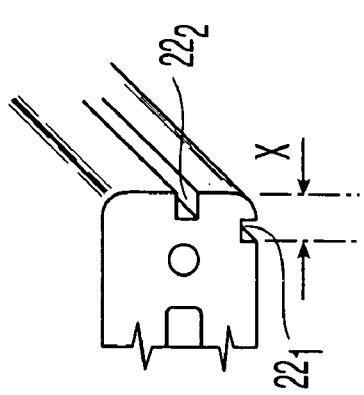
Figure 15E:
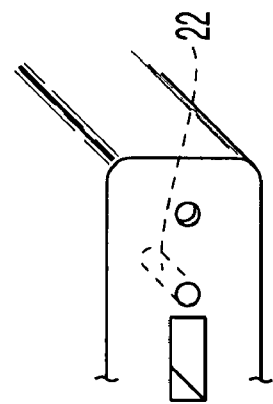
Figure 15D:
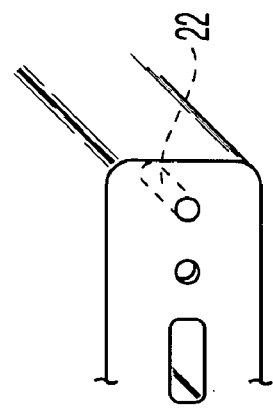

Alternately, adapter 38 may comprise at one end datum 40 that can mate with datum 22', while on the opposite end be connected to fuel source or fuel supply 44 via fuel conduit 46, as illustrated in FIG. 14(*b*). The adapter can also be connected to multiple fuel supplies that are in fluid communication with each other. An advantage of this embodiment is that fuel supply 44 can be a relatively large supply that can supply fuel to a plurality of electronic devices 26. Fuel conduit 46 can be one or more tubings establishing a fluid communication from fuel supply 44 to adapter 38. Alternately, fuel conduit 46 can be a manifold comprising a plurality of valves and fittings so that a single adapter can be used with a plurality of fuel supplies or a single fuel supply can be used with a plurality of adapters.

Electronic device 26 may further comprise a retention mechanism to hold cartridge 10 after the cartridge is inserted into the electronic device. For example, electronic device 26 may have a C-clip adapted to mate with a pin datum, such as pin datum $22_2$ illustrated in FIG. 3(*e*), to hold cartridge 10 securely. Additionally, another retention such as arm 48, which is located in chamber 28 of the electronic device, is adapted to engage the distal end of dovetail datum $22_3$ to retain cartridge 10 within chamber 28. Preferably arm 48 is biased toward the retention position.

In accordance to another aspect of the present invention, the datum can also be used to prevent an incompatible fuel to be inserted into an electronic device. As discussed above, usable fuel cell fuels include methanol, sodium borohydride, hydrocarbons, among many others. Using the datum system, a single fuel is associated with a particular datum and fuel supply containing incompatible fuel cannot be inserted into the host electronic device. As shown in FIGS. 15(*a*)–(*c*), cartridges 10 have notch datum $22_1$ and $22_2$. The distance between the two notch datum points is designated as X. For a particular type of fuel, distance X is selected for that fuel, such that fuel supplies containing other fuel cannot be inserted into the host device. As shown in FIGS. 15(*d*) and (*e*), notch datum points $22_1$ and $22_2$ can be replaced by a single recess datum 22. Recess datum 22 is adapted to receive a pin positioned in chamber 28. As shown, the locations of the recess datum and the functional elements can be interchanged to define a datum for a particular fuel.

While it is apparent that the illustrative embodiments of the invention disclosed herein fulfill the objectives of the present invention, it is appreciated that numerous modifications and other embodiments may be devised by those skilled in the art. For example, one functional element can be positioned relative to a datum and the other functional elements can be positioned indirectly to the datum, i.e., the other functional elements are positioned relative to first functional element. Additionally, feature(s) and/or element(s) from any embodiment may be used singly or in combination with other embodiment(s). Referring to FIGS. 16(*a*)–(*o*), a plurality of front faces 16 is illustrated. Datum 22 can be notches, pins, recesses, protruding corners, and dovetails among others, and can be used interchangeably. The locations of the datum can be pre-selected or standardized to satisfy any criteria. Therefore, it will be understood that the appended claims are intended to cover all such modifications and embodiments, which would come within the spirit and scope of the present invention.

We claim:

1. A fuel supply containing fuel adapted to be connected to any of a plurality of host devices, wherein the fuel supply comprises
   at least one functional element, wherein the at least one functional element is positioned relative to a datum origin defined on the fuel supply,
   wherein when the fuel supply is connected to any of the plurality of host devices, the datum origin matches a matching datum origin on the host device and the at least one functional element is connected to a corresponding connection on the host device, and
   wherein the datum origin facilitates interchangeability of the fuel supply with respect to the plurality of host devices.

2. The fuel supply of claim 1, wherein at least one of the host devices is an electronic device powered by a fuel cell.

3. The fuel supply of claim 1, wherein at least one of the host devices is a fuel cell.

4. The fuel supply of claim 1, wherein at least one of the host devices is a charger.

5. The fuel supply of claim 1, wherein the at least one functional element is located on a front face of the fuel supply.

6. The fuel supply of claim 1, wherein the at least one functional element is located on a side of the cartridge.

7. The fuel supply of claim 1, wherein the at least one functional element is located on a top of the cartridge.

8. The fuel supply of claim 1, wherein the at least one functional element is located on a bottom of the cartridge.

9. The fuel supply of claim 1, wherein the at least one functional element is located on a back face of the cartridge.

10. The fuel supply of claim 5, wherein the front face is substantially flat.

11. The fuel supply of claim 5, wherein the front face is curved.

12. The fuel supply of claim 1, wherein the front face comprises non-planar portions.

13. The fuel supply of claim 12, wherein the at least one functional element is located on one of the non-planar portion.

14. The fuel supply of claim 12, wherein the non-planar portions are parallel.

15. The fuel supply of claim 12, wherein the non-planar portions are non-parallel.

16. The fuel supply of claim 1, wherein the at least one functional element coincides with the datum origin.

17. The fuel supply of claim 1, wherein the at least one functional element comprises a memory storage device, an electrical connection, a pneumatic connection, a sensor, a fuel filling port, a refill valve, an orientation feature or a guide.

18. The fuel supply of claim 1, wherein the datum origin comprises a corner datum.

19. The fuel supply of claim 1, wherein the datum origin comprises a protruding datum.

20. The fuel supply of claim 1, wherein the datum origin comprises a width datum.

21. The fuel supply of claim 1, wherein the datum origin comprises orthogonal datum points.

22. The fuel supply of claim 1, wherein the datum origin comprises a notch datum.

23. The fuel supply of claim 22, wherein the notch datum comprises two orthogonal legs.

24. The fuel supply of claim 1, wherein the datum origin comprises a pin datum.

25. The fuel supply of claim 1, wherein the position of the at least one functional element is measured from the datum origin using a Cartesian coordinate.

26. The fuel supply of claim 1, wherein the position of the at least one functional element is measured from the datum origin using a spherical or a polar coordinate.

27. The fuel supply of claim 1, wherein after the fuel supply is connected to any of the host devices, the fuel supply forms a part of an exterior surface of the host device.

28. The fuel supply of claim 1, wherein after the fuel supply is connected to any of the host devices, the fuel supply does not form a part of an exterior surface of the host device.

29. The fuel supply of claim 1, wherein the datum origin is selected to correspond to a specific fuel.

30. An adapter for connecting a fuel supply to any of a plurality of host devices comprising
   at least one first functional element positioned on the adapter and configured to be connected to a corresponding first connection positioned on the plurality of host devices, wherein the first functional element is positioned relative to a first datum origin on the adapter and the first datum origin matches a first matching datum origin on the at least one of the plurality of host devices, and
   at least one second functional element positioned on the fuel supply and configured to be connected to a corresponding second connection positioned on the adapter,
   wherein when the adapter is connected to the fuel supply and at least one of the plurality of host devices, a fuel from the fuel supply is transportable to the host device.

31. The adapter of claim 30, wherein the adapter is connected to the fuel supply by at least one tubing.

32. The adapter of claim 30, wherein the adapter is connected to the fuel supply by a manifold.

33. The adapter of claim 30, wherein the adapter is connected to a plurality of fuel supplies, wherein the fuel supplies are in fluid communication with each other.

34. A fuel supply containing a fuel and adapted to be connected to any of a plurality of host devices, wherein the fuel supply comprises
   at least one functional element, wherein the at least one functional element is positioned relative to a functional datum origin defined on the fuel supply,
   wherein when the fuel supply is connected to the host device the functional datum origin matches a matching datum origin on the host device and the at least one functional element is connected to corresponding connection on the host device, and
   wherein the functional datum origin comprises a memory storage device, an electrical connection, a pneumatic connection, a sensor, a fuel filling port, a refill valve, an orientation feature or a guide, and
   wherein the datum origin facilitates interchangeability of the fuel supply with respect to the plurality of host devices.

35. The fuel supply of claim 1, wherein the datum origin is located on a front face of the fuel supply.

* * * * *

UNITED STATES PATENT AND TRADEMARK OFFICE
CERTIFICATE OF CORRECTION

PATENT NO. : 7,117,906 B2  Page 1 of 1
APPLICATION NO. : 10/773481
DATED : October 10, 2006
INVENTOR(S) : Paul Adams and Andrew J. Curello It is certified that error appears in the above-identified patent and that said Letters Patent is hereby corrected as shown below:

In claim 12, in column 12, line 39, please replace the reference "claim 1" with the reference --claim 5.--

Signed and Sealed this

Ninth Day of September, 2008

JON W. DUDAS
*Director of the United States Patent and Trademark Office*